March 1, 1960

L. PÉRAS 2,926,795

AUTOMATIC HANDLING DEVICES, NOTABLY FOR
A PLURALITY OF MACHINE-TOOLS MACHINING
A SAME WORKPIECE SUCCESSIVELY

Filed June 6, 1958

Inventor
Lucien Péras
By Stevens Davis Miller & Mosher
his attorneys

March 1, 1960

L. PÉRAS 2,926,795

AUTOMATIC HANDLING DEVICES, NOTABLY FOR
A PLURALITY OF MACHINE-TOOLS MACHINING
A SAME WORKPIECE SUCCESSIVELY

Filed June 6, 1958

Inventor
Lucien Péras
By Stevens Davis Miller & Mosher
his attorneys

March 1, 1960

L. PÉRAS 2,926,795

AUTOMATIC HANDLING DEVICES, NOTABLY FOR
A PLURALITY OF MACHINE-TOOLS MACHINING
A SAME WORKPIECE SUCCESSIVELY

Filed June 6, 1958

Inventor
Lucien Péras
By Stevens Davis Miller & Mosher
his attorneys

United States Patent Office 2,926,795
Patented Mar. 1, 1960

2,926,795
AUTOMATIC HANDLING DEVICES, NOTABLY FOR A PLURALITY OF MACHINE-TOOLS MACHINING A SAME WORKPIECE SUCCESSIVELY

Lucien Peras, Billancourt, France, assignor to Regie Nationale des Usines Renault, Billancourt, France Application June 6, 1958, Serial No. 740,444

Claims priority, application France July 11, 1957

7 Claims. (Cl. 214—1)

This invention relates to an automatic device for handling workpieces comprising or consisting of a shaft or like cylindrical body to be disposed between centers or like members on a plurality of machine tools adapted to perform automatically and simultaneously different machining operations on these workpieces.

According to this invention, a workpiece loading and unloading device is provided on the bed of each machine tool and adapted to pick up these workpieces from a supply conveyor associated with the machine concerned and to place the workpiece between centers, as well as to remove the workpiece from the machine upon completion of the machining operation and deliver the workpiece to a conveyor adapted to feed and associated with the next machine, the conveyor movements as well as the operation of the loading and unloading devices being synchronized between all the machines, whereas the supply of workpieces to the feed conveyor associated with the first machine and the removal of the finished workpieces from the last machine of the series are accomplished in any suitable manner.

According to this invention, and more particularly to a specific form of embodiment thereof concerning the shaving of gears formed integrally with a shaft, for example a gearbox or transmission shaft, each gear being machined on a different machine, the loading device is adapted simultaneously to bring the shaft in a suitable position between the centers and the gear concerned in proper engagement with the machine cutter or like tool.

In order to afford a clearer understanding of this invention and of the manner in which the same may be carried out in the practice, reference will now be made to the attached drawings forming part of this specification and illustrating diagrammatically by way of example a typical form of embodiment of the handling device of this invention in the specific case of an installation for finishing transmission gear shafts, this operation being usually termed "shaving." In the drawings:

Figure 5 is an elevational and longitudinal sectional view showing the shaft loading and unloading device of which

Figure 1:
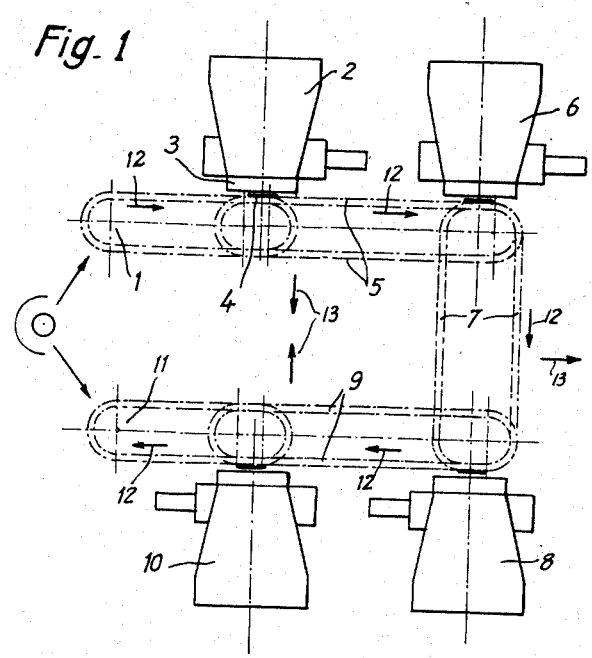
Figure 1 is a plane view of the lay-out of four machine adapted to machine four-gear shafts and fed with workpieces under the conditions broadly set forth hereinabove.

Firstly, the general arrangement of this typical installation for automatic handling according to this invention will be briefly described with reference to the lay-out diagram of Fig. 1 in which the reference numeral 1 denotes the conveyor for loading, and supplying workpieces to, the first machine of which the head 2 is adapted to perform the shaving operation on the reverse gear of the shaft. The loading and unloading device associated with this machine is shown diagrammatically at 3 and adapted automatically to pick up from the conveyor 1 each shaft brought to position 4 and to subsequently discharge same at the same position but at a different level onto another conveyor 5 feeding the second machine and disposed partly beneath the first conveyor 1 in the installation illustrated. This conveyor 5 as well as any conveyor supplying workpieces from one machine to another machine comprises a first section inclined upwards and a second section adapted to feed the shafts to the next machine comprising a head 6 adapted to machine the first-speed gear. The conveyor 7 for unloading this machine delivers the workpiece to the third machine 8 in which the second-speed gear is machined, and then the workpiece is fed to a fourth machine 10 machining the third-speed gear. From this last-mentioned machine the shafts are discharged onto a delivery conveyor 11, the supply of pieces to conveyor 1 and the removal of finished pieces from conveyor 11 taking place either automatically or manually, one of the conveyors extending at right angles to the others to simplify the supply of shafts to be machined and the removal of finished shafts.

Each conveyor comprises shaft-supporting members disposed at spaced intervals and forming a closed circuit extending and travelling in the direction of the arrows 12; of course, the displacement of these members is subordinate to the rate of operation and relative timing of the machines, as will be made clear presently.

To facilitate the fitting of cutters or like maintainance works on the machines, these conveyors may be displaced in directions perpendicular to themselves as indicated by the arrow 13, their supporting frames being mounted on rollers, wheels or the like, and provided with means for locking the conveyors in their operating position.

Figure 2:
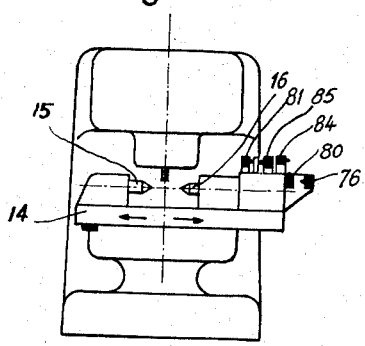
Figure 2 is a diagrammatic elevational and front view of a single machine.
Figure 4:
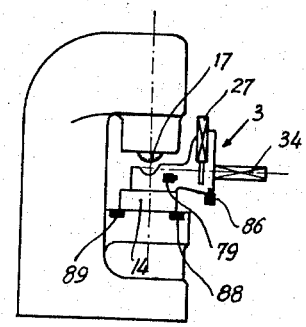
Figure 4 is a side elevational view of the machine shown in Fig. 2 and provided with the shaft loading and unloading device.
Figure 3:
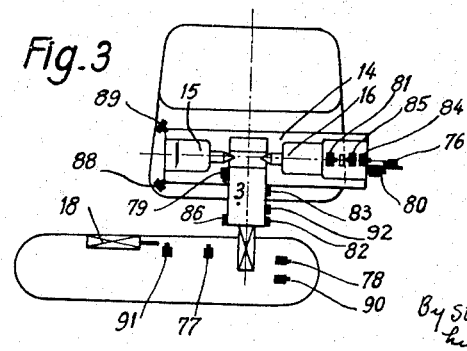
Figure 3 is a plane view of the machine shown in Fig. 2, to illustrate the removal of the head and show diagrammatically the feed conveyor as well as the device for loading and unloading the shafts.

A diagrammatic example of the equipment of each machine in the installation considered herein is illustrated in Figs. 2 to 4 of the drawings.

The bed 14 of the machine carries the dead center 15 and the movable tail-stock center 16 between which each shaft is placed for carrying out on one of its gears the shaving operation performed by a circular cutter 17, of known type. Fig. 3 shows the feed conveyor of the machine wherein the shaft-supporting members are fed by means of a pneumatic cylinder 18. In Figs. 3 and 4, there is also shown the loading and unloading device 3 constituting the essential element of this handling assembly.

A series of conductors and switches controlling the different machining steps are provided on each machine, their functions will be described presently.

Figure 5:
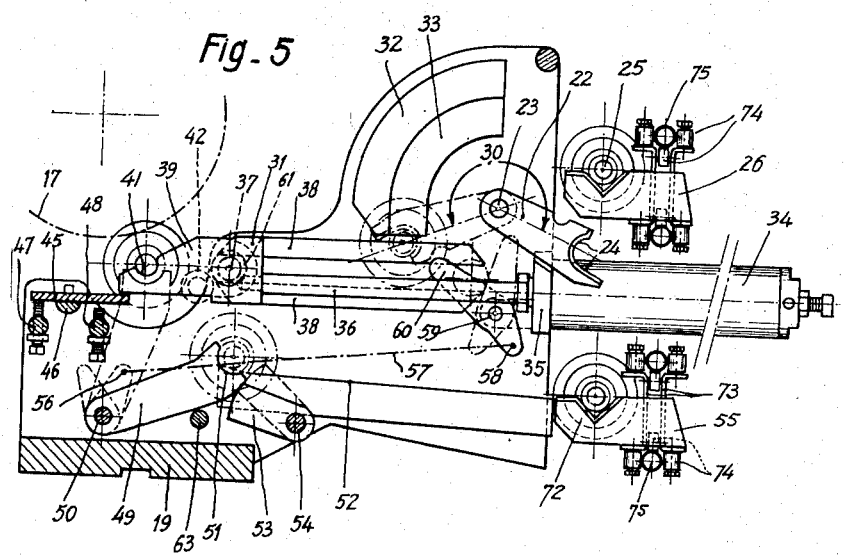
Figure 6:
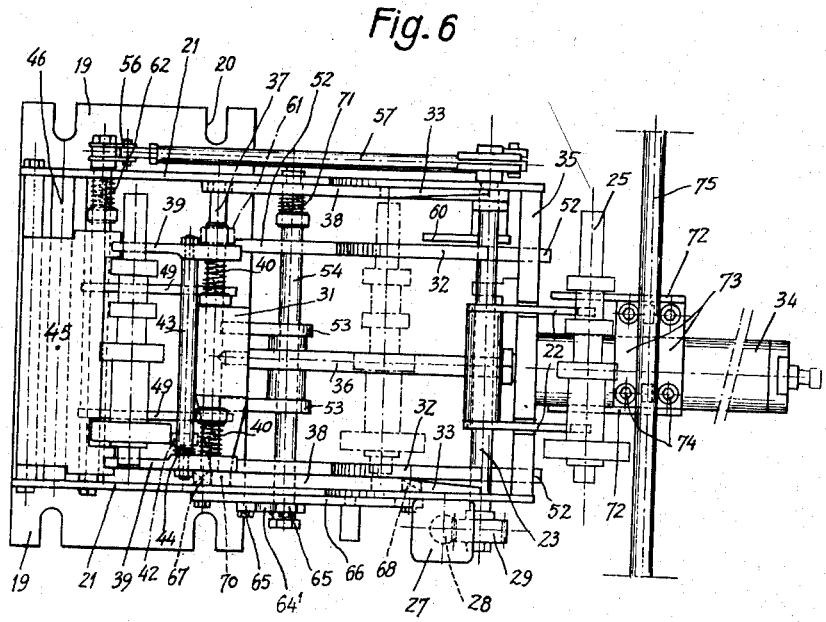
Figure 6 is a plane view illustrating its essential component elements.
Figure 7:
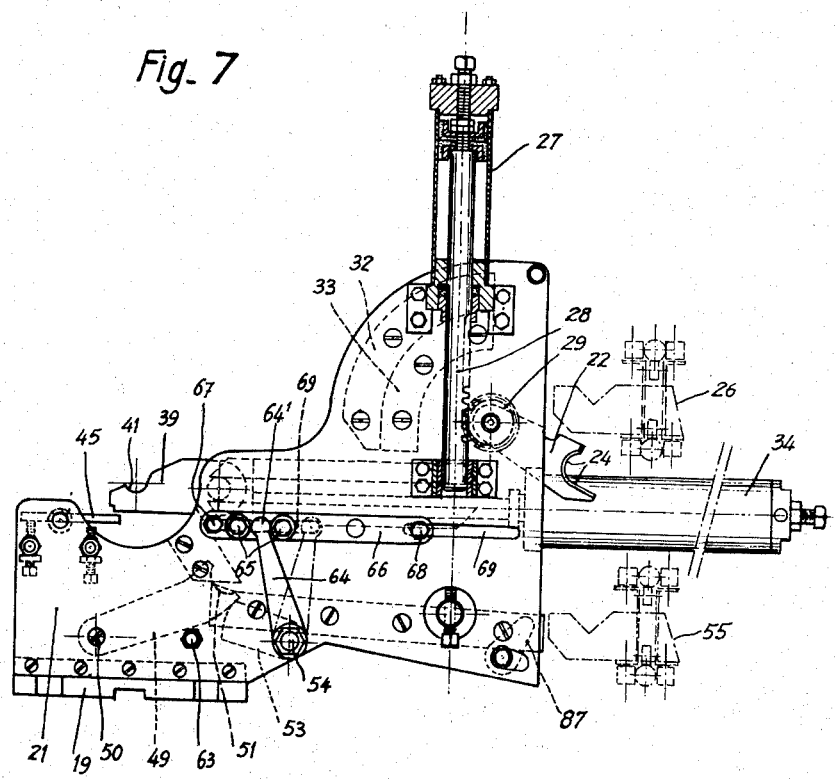
Figure 7 is an external, elevational and part-sectional view similar to Fig. 5 illustrating other component elements of the device.

The loading and unloading device 3 illustrated separately in Figs. 5 to 7 is secured on the bed of the machine by means of its base 19 formed with notches 20; on this base 19 are also secured the plates 21 extending at right angles thereto and supporting the various component elements of the device. This device comprises firstly a two-armed loading lever 22 solid with a shaft 23, each arm of the lever 22 being provided with a forked end 24 adapted to engage the shaft 25 to be machined which is fed on one of the movable supports 26 of the feed conveyor. This lever 22 is actuated by means of a pneumatic cylinder 27 of which the piston rod is formed with rack teeth 28 meshing with a pinion 29 wedged on the pin 23. Thus, a movement corresponding to an angle 30 may be imparted to the lever 22 so as to pick up the shaft or like workpiece 25 with the assistance of the forked ends 24 and transfer same to a carriage 31 pertaining to the loading device; a pair of fixed guide members 32 having the form of circular sectors are provided for properly guiding the shaft 25 when the lever 22 has moved beyond the vertical position, and another pair of guide members 33 having vertical faces inclined inwards of the device are provided for properly positioning the shaft in a direction transverse to its loading direction. These guide members are secured on plates 21, as shown in Fig. 7, whereas in Fig. 6 the means for securing these guide members on the plates as well as the various bracing members have been eliminated to simplify this figure and show more clearly the essential component elements of the device.

The carriage 31 is adapted to travel in a direction parallel to the plates 21 under the control of a pneumatic cylinder 34 secured on a cross member 35 and having its rod 36 connected to the body 31 of the carriage. This carriage comprises, in addition, a rod 37 solid with the body 31 and guided at its ends by means of rollers or the like in fixed slideways 38. A pair of arms 39 are pivoted on this rod to constitute a resilient support for the shafts to be machined, the displacement of these arms about their axis being controlled by springs 40.

In the retracted position of the piston rod of cylinder 34 the arms 39 of the resilient support of the carriage are placed at the outlet of the guide members 32, 33 so that the shaft to be machined will firstly engage these arms and subsequently the notches 41 thereof.

Due to the action of cylinder 34 the shaft 25 placed on the carriage is brought between the centers of the machine under the shaving cutter 17, the gear to be machined rolling under the teeth of this cutter after engaging same, the resilient support 39 having the function of permitting the proper meshing engagement of the cutter teeth with the pinion while yielding slightly in the downward direction. Preferably, a pinion 42 mounted for slight loose rotation on a pivot pin 43 is provided, this pinion interconnecting the arms 39 and being adapted, due to the provision of a spring 44 retarding its rotation and also to the fact that it is adapted to mesh with one of the gears of the shaft to be machined, to permit a suitable relative slipping of these shafts relative to the shaving cutter as the gear to be machined contacts this cutter. The end of the movement of support 39 is controlled with the assistance of an oscillating stop plate 34 pivoted through the medium of a rod 46 for movement between adjustable stops 47, 48, this arrangement constituting a mechanical safety device adapted properly to place the shaft 25 to be machined between the centers.

The shaft on which the machining step has just been completed is discharged from the machine by means of a two-armed lever 49 fulcrumed on a pin 50 and formed with forked ends 51 positioned, during the operation of the machine, beneath the shaft or workpiece to be removed so as to receive this shaft when it is released by the centers. This lever 49 is adapted to deposit the workpiece onto an inclined plane consisting of a pair of ramps 52 on which it will be momentarily retained by a stop 53 keyed on a shaft 54.

The shaft or workpiece to be removed will then roll slowly by gravity on the inclined plane 52 to engage, at the outlet end of the device, one of the movable supports 55 of the discharge conveyer which, as already stated, supplies workpieces to the next machine.

The adequate displacements of the discharge lever 49 are controlled or permitted by utilizing the movements of the carriage 31 by virtue of the mechanical connections described hereafter, the displacement of this lever in the discharging direction being caused by the weight of the shafts.

Wedged on the pin 50 of the discharge lever is another lever 56 connected through a link 57 to a lever 58 wedged in turn on the pin 59 of a lever 60, a roller 61 mounted on the carriage pin 37 co-acting with this lever 60, as shown. Thus, when the carriage is in its retracted position the roller 61 engages the lever 60 and the discharge lever 49 is brought to the position in which it can receive the shaft to be machined (this position being shown in chain-dotted lines in Fig. 5). When the carriage 31 moves to bring a fresh workpiece under the cutter, it permits during the initial portion of this movement the lowering of the discharge lever 49 which takes place by gravity, that is, by reason of the weight of the workpiece, the latter being thus deposited onto the inclined place 52. A spring 62 is mounted on the pivot pin of lever 49 to replace the action of gravity when the workpiece is not supported by this lever of which the downward movement is limited by a stop 63. The other levers connected to the discharge lever will then occupy the positions shown in thick lines in Fig. 5.

The displacements of the retarding stop 53 are also controlled by utilizing those of the carriage 31. To this end, a control lever 64 is solid with the pivot pin of stop 53, its end $64^1$ being fitted between a pair of rollers 65 carried by a bar 66 sliding on a plate of the device and visible in Figs. 6 and 7. This bar 66 carries a pair of stop members 67, 68 having fixation pins extending through slots 69 formed in the relevant plate, and the carriage body carries at its lower end a control stud 70 co-acting with these stop members. With this arrangement the retarding stop 53 is retracted at the end of the forward stroke of the carriage due to the action of the stud 70 on stop member 67, that is, just after the workpiece to be discharged has been deposited onto the inclined plane. The stop 53 is returned to its operative position—at the end of the backward stroke of the carriage—by the action of stud 70 on stop member 68, which corresponds to the resetting of the discharge lever 49 to its waiting position. Preferably, safety means are provided to avoid any risk of retraction of this stop member during the initial portion of the carriage stroke in the forward or positive direction which, as already set forth, corresponds to the downward movement of the workpiece to be discharged which is supported by the lever 49, until this workpiece is laid upon the inclined plane 52; to this end, a spring 71 is provided on the pivot pin of said stop member to urge same in the stopping position so that the workpiece will be retained for a short time by this stop member.

On the other hand, as shown notably in Figs. 5 and 6, the conveyors—of which the essential features have been set forth hereinabove—comprise in this specific form of embodiment a pair of workpiece supporting arms 72 welded to a pair of opposite U-shaped plates 73 carrying guide rollers 74 engaging a pair of continuous rods 75 forming a closed circuit. These conveying elements are interconnected on a same conveyor with the assistance of a cable along which they are disposed at spaced intervals, the cylinder 18 which controls their movements by acting successively on each of them being provided with a retractable actuating stud, for example a pawl.

The operation of this handling installation, which is the same for all the machines, will be described hereafter.

The mechanism of the machine comprises an automatic time-switch controlling the end of the gear shaving operation and simultaneously the opening of the centers, that is, the displacement of center 16 under the action of a pneumatic cylinder (not shown).

At this time of the cycle of operation the carriage is in its rear position and carries already the new shaft to be machined, the feed conveyor being empty at the inlet end of the device, the discharge conveyory carrying on the outlet end the previously machined shaft whilst the loading lever 22 is positioned to effect a subsequent loading, and the discharge lever 49 receives the workpiece just delivered from the centers.

Of course, the terms "operation release" utilized hereafter means that the handling devices operate simultaneously in all the machines of the installation concerned, after the same steps of the cycle have been performed by each machine, any incident occurring in one machine involving automatically the stoppage of the complete installation.

The beginning of the cycle set forth hereafter is thus coincident with the end of the machining period having the longest period of operation. The end of the movement of the movable center 16 will thus release the conveyor control means through the intermediary of a switch 76 energizing a solenoid valve adapted to supply fluid to the cylinder 18 in the proper direction, another switch 77 controlling the operation of the conveyors and permitting the backward movement of this cylinder 18.

The conveyor movement controls, through the medium of the shaft or like workpiece moving past the inlet of the loading device, another switch 78 releasing the loading carriage movement, the latter permitting firstly the removal of the workpiece 25 received by the lever 49 so that this shaft will be placed onto the discharge conveyor under the conditions already set forth. The workpiece carried by the carriage is brought under the shaving cutter and the limit switch 79 controlling the forward stroke of the carriage releases the center-closing control. The movable center 16 controls at the end of its stroke on the one hand the switch 80 permitting the return of the empty carriage (the resilient supports thereof being retracted relative to the workpiece) and on the other hand a switch 81 permitting the rotation of the shaving cutter. The carriage is also adapted, upon completion of its return stroke, to control the switch 82 permitting another loading operation by actuating the lever 22, the other switch 83 actuated upon completion of the stroke corresponding to this operation permitting the return of lever 22 to its waiting position.

The shaving operation is performed in several cuts, the bed 14 of the machine moving from left to right and vice versa (relative to Fig. 2), an upward movement of the bed corresponding to each displacement until the operation is completed, whereafter the bed resumes its initial position.

The stoppage of the machine corresponds to the beginning of another cycle as described hereabove, the initial conditions set forth at the beginning of this disclosure on the operation of the machine being restored again.

Various safety switches are provided, as shown in Figs. 2 to 4, for the purpose of checking the operative steps explained in the last paragraphs; their operation is described hereafter.

The limit switch 84 actuated upon completion of the forward stroke of the movable center 16 prevents the cutter from starting its operation if no workpiece is placed between the centers.

The limit switch 85 actuated upon completion of the backward stroke of the movable center 16 prevents the cutter from being started.

Another switch 86 is actuated through the medium of a tilting stop 87 disposed at the outlet of the inclined plane 52; this switch visible in Fig. 7 but not in Fig. 6 serves the purpose of checking the removal of the workpieces and releases the means controlling the subsequent feed movement of the conveyors.

Another switch 88 checks the position of the bed 14 of the machine and permits the loading through the lever 22 when the bed is in its left-hand position, whilst a switch 89 checking the same position of the bed permits the forward movement of the carriage. Switch 90 normally responsive like switch 78 to the presence of a workpiece on the conveyor at the inlet end of the device is adapted to check whether this workpiece has been duly removed by the lever 22; if not, it prevents the conveyors from effecting their next movement.

Besides, a switch 91 checks the waiting position of the conveyor cylinder and prevents any loading through the lever 22 during the conveyor movement; switch 92 keeps these conveyors inoperative during the loading operation. Moreover, a marking device (not shown) punches the workpiece when the latter has been deposited onto the carriage with the number of the shaving cutter in view of subsequently pairing the gears as normally required.

Of course, the switch arrangement is given by way of example only and should not be construed as limiting in any manner the purpose of the invention; they have been described to assist in the disclosure of the successive steps of the operation and in connection with the arrangement of the handling device according to this invention, the complete automatic control installation being designed according to the techniques well known to the specialists.

It is also clear that the handling device of this invention, while being more particularly advantageous in its specific application to a set of machines adapted to perform different machining steps on a same workpiece, these steps having a duration of the same order, is also applicable with the same means to a single machine without departing from the spirit and scope of the invention as set forth in the appended claims.

I claim:

1. For use with an automatic machine having centers or similar members, a handling device for workpieces to be positioned between the centers, said device comprising a carriage movable in translation from a remote pick up position to a position adjacent the centers so as to position the workpieces between the centers, said carriage having cooperating supporting arms for carrying the workpieces, said arms being elastically mounted and having a clearance which permits their retraction upon the return of the carriage, means for delivering the workpieces to the carriage and positioning them between the arms in the remote position of the carriage from the centers, means for moving the carriage from its remote position to a position adjacent the centers and means for removing the workpieces from between the centers to dispose and transfer them beneath the carriage to a removal means.

2. For use with an automatic machine having centers or similar members, a handling device for workpieces to be positioned between the centers, said handling device comprising a base extending laterally from the automatic machine and arranged horizontally at right angles to the centers, vertical side plates carried by said base, a feed conveyor arranged at the outer end of the base, a removal conveyor arranged below the feed conveyor, a carriage slidably mounted on the base between the side plates and having supporting arms for carrying the workpieces from the feed conveyor to a position between the centers, said arms being elastically mounted and having a clearance which permits their retraction upon the return of the carriage, a rotary loading lever provided with forked arms and arranged at the outer end of the base and adapted to pick up a workpiece from the feed conveyor, and to bring the same between the side plates along a substantially semi-circular upper path, circular and lateral guide members ensuring the proper dropping of the workpieces which are transferred by the lever to the arms of the carriage, a pivoted forked unloading lever disposed beneath said centers and adapted to receive the workpieces upon completion of the operation and an inclined plane provided under the base and adapted to receive a workpiece from the pivoted unloaded fork lever and adapted to direct the workpieces to the removal conveyor.

3. Automatic handling device according to claim 2, characterized in that said loading lever and said carriage are each actuated from a power device comprising a pneumatic cylinder, said unloading lever being pivoted to take advantage of the weight of the workpieces for placing them onto the inclined plane for discharging purposes and being responsive to the displacement of said carriage by means of a mechanical linkage so that when said carriage is positioned to receive a workpiece said unloading lever underlies the workpiece during the machining thereof, and that when the loading carriage begins its operative stroke towards the centers the unloading lever is allowed to tilt.

4. Automatic handling device according to claim 2, characterized in that said inclined plane is provided with a pivoting stop member for retarding the travel of the workpieces laid thereon by said unloading lever, said stop member being responsive to the displacement of said loading carriage by virtue of mechanical control means such that said carriage will cause said stop member to be either retracted by tilting at the end of its stroke towards said centers or raised upon completion of its reverse stroke.

5. Automatic handling device according to claim 4, characterized in that said mechanical means controlling the operation of said retarding stop member consists of a lever pivotally solid with said stop member and connected to a member adapted to slide on one of said side plates of the device, said sliding member being provided with limit stops engaged by said carriage at either end of its stroke.

6. Automatic handling device according to claim 2, characterized in that the carriage arms are resiliently pivoted under such conditions that they permit a proper meshing engagement between a gear on the workpiece to be machined and a cutter on the automatic machine against and under which it is pushed by the carriage, said arms co-acting with an adjustable stop member for properly positioning the workpiece under the cutter and between the centers, said arms carrying preferably a pinion of which the rotation is retarded, said pinion being adapted to mesh with a gear of the workpiece to retard the rotation of said workpiece when positioning same under the cutter.

7. Automatic handling device according to claim 2, characterized in that said conveyors are of the closed-circuit type and comprise members for supporting the workpieces which are held at spaced intervals and actuated at each cycle by a pneumatic cylinder.

References Cited in the file of this patent

UNITED STATES PATENTS 2,554,699     Gamble _____ May 29, 1951